United States Patent
Kim et al.

(10) Patent No.: US 12,127,004 B2
(45) Date of Patent: Oct. 22, 2024

(54) SDN-BASED INTRUSION RESPONSE METHOD FOR IN-VEHICLE NETWORK AND SYSTEM USING SAME

(71) Applicants: Hyundai Motor Company, Seoul (KR); Kia Corporation, Seoul (KR); Korea University Research and Business Foundation, Seoul (KR)

(72) Inventors: Huy Kang Kim, Seoul (KR); Seong Hoon Jeong, Seoul (KR); Seung Wook Park, Gyeonggi-do (KR); Wha Pyeong Lim, Gyeonggi-do (KR)

(73) Assignees: Hyundai Motor Company, Seoul (KR); Kia Corporation, Seoul (KR); Korea University Research and Business Foundation, Seoul (KR)

( * ) Notice: Subject to any disclaimer, the term of this patent is extended or adjusted under 35 U.S.C. 154(b) by 22 days.

(21) Appl. No.: 17/631,809

(22) PCT Filed: Jul. 31, 2020

(86) PCT No.: PCT/KR2020/010142
§ 371 (c)(1),
(2) Date: Jan. 31, 2022

(87) PCT Pub. No.: WO2021/020935
PCT Pub. Date: Feb. 4, 2021

(65) Prior Publication Data
US 2024/0040381 A1  Feb. 1, 2024

(30) Foreign Application Priority Data

Jul. 31, 2019 (KR) .................. 10-2019-0093503
Jul. 30, 2020 (KR) .................. 10-2020-0095519

(51) Int. Cl.
*H04W 12/121* (2021.01)

(52) U.S. Cl.
CPC .............................. *H04W 12/121* (2021.01)

(58) Field of Classification Search
CPC .. H04W 12/121; H04W 4/48; H04L 63/1408; H04L 63/1416; H04L 63/1425; H04L 63/1441
See application file for complete search history.

(56) References Cited

U.S. PATENT DOCUMENTS

| 11,341,238 B2 * | 5/2022 | Stamper | H04L 63/08 |
| 2014/0112187 A1 * | 4/2014 | Kang | H04L 43/024 |
| | | | 370/253 |

(Continued)

FOREIGN PATENT DOCUMENTS

| CN | 104506507 A | 4/2015 |
| CN | 106454719 A | 2/2017 |

(Continued)

OTHER PUBLICATIONS

First Chinese Office Action for Chinese Patent Application No. 2020800558473 dated May 13, 2024, English translation, 22 pages.

(Continued)

*Primary Examiner* — Kenneth T Lam
(74) *Attorney, Agent, or Firm* — Fox Rothschild LLP

(57) ABSTRACT

Provided are an intrusion prevention system and a method for detecting and responding to a vehicle intrusion by means of an SDN support switch installed in an in-vehicle network (IVN) and an SDN controller communicating with the SDN-enabled switch, the method in which the SDN controller receives a flow table from the SDN-enabled switch, enables an intrusion detection system (IDS) to perform intrusion detection, and updates the flow table on the basis of the intrusion detection execution result.

11 Claims, 11 Drawing Sheets

(56) References Cited

U.S. PATENT DOCUMENTS

| | | | |
|---|---|---|---|
| 2016/0149788 A1* | 5/2016 | Zhang | H04L 43/0829 709/224 |
| 2016/0342531 A1* | 11/2016 | Sharma | G06F 12/1408 |
| 2017/0006082 A1* | 1/2017 | Shishodia | H04L 67/025 |
| 2017/0078176 A1* | 3/2017 | Lakshmikantha | H04L 43/0852 |
| 2017/0078184 A1* | 3/2017 | Tang | H04L 45/64 |
| 2017/0171050 A1* | 6/2017 | Puzis | H04L 43/0876 |
| 2018/0309781 A1* | 10/2018 | Tandel | H04L 12/4641 |
| 2019/0044912 A1* | 2/2019 | Yang | G06F 21/50 |
| 2019/0081966 A1* | 3/2019 | Ploucha | H04L 63/1425 |
| 2020/0145251 A1* | 5/2020 | Hass | G06F 11/076 |
| 2020/0183373 A1* | 6/2020 | Choi | G05B 23/024 |
| 2020/0186556 A1* | 6/2020 | Moriya | H04L 43/08 |
| 2022/0078620 A1* | 3/2022 | Haddad | H04W 12/63 |
| 2022/0086064 A1* | 3/2022 | Sivaraman | H04L 47/2483 |

FOREIGN PATENT DOCUMENTS

| | | |
|---|---|---|
| CN | 107645472 A | 1/2018 |
| CN | 107770174 A | 3/2018 |
| CN | 109274673 A | 1/2019 |
| CN | 109618283 A | 4/2019 |
| KR | 10-2014-0051776 A | 5/2014 |
| KR | 101553264 B1 | 9/2015 |
| KR | 10-2017-0010835 A | 2/2017 |
| KR | 101855742 B1 | 5/2018 |
| WO | 2012144217 A1 | 10/2012 |

OTHER PUBLICATIONS

Zhiqing, H. et al., "QoS routing algorithm of software-defined IoV based on network calculus", journal of Computer Applications, 2018, 38(S2): 201-205, ISSN 1001-9081.

* cited by examiner

SDN-BASED INTRUSION RESPONSE METHOD FOR IN-VEHICLE NETWORK AND SYSTEM USING SAME

CROSS-REFERENCE TO RELATED APPLICATION

This application is a National Phase application filed under 35 USC 371 of PCT Application No. PCT/KR2020/010142 with an International Filing Date of Jul. 31, 2020, which claims priority, under 35 U.S.C § 119 (a), to Patent Application No. 10-2019-0093503, filed in Korea on Jul. 31, 2019, and Patent Application No. 10-2020-0095518, filed in Korea on Jul. 30, 2020, the entire contents of which are incorporated herein by reference. In addition, this patent application claims priority in countries other than the United States for the same reason as above, and the entire contents thereof are incorporated herein by reference.

TECHNICAL FIELD

The present disclosure relates to a technology for detecting and blocking an intrusion or attack on an in-vehicle network (IVN).

BACKGROUND

The contents described in this section merely provide background information for the present embodiment and do not constitute a related art.

Commercial vehicles adopting vehicle-to-everything (V2X) communication and network-based autonomous driving-related technologies have been developed. However, commercial vehicles to which V2X communication and an in-vehicle network are vulnerable to attacks made by invading communication networks or network communications. FIG. 1 is a diagram illustrating classification of types of security threats in vehicles. Attacks threatening the security of vehicles include privilege stealing attacks and non-privilege stealing attacks, external attacks based on attack sources, and internal attacks against internal elements vehicles. Internal attacks are usually carried out by attackers by physically accessing a target vehicle to inflict tangible damage, whereas external attacks mainly use sensor-based systems such as short-range RF communications, keyless entry systems, or tire pressure monitoring systems, so a weight thereof is limited. However, as the in-vehicle connectivity in the IVN environment and the inter-vehicle connectivity in the V2X environment increase, an impact of external attacks on vehicles is expected to increase.

Even when an attack or intrusion is properly detected, how to mitigate the attack or intrusion in response has been a problem. The previously proposed mitigation methods have not been appropriate alternatives to attacks on IVN vehicles.

In other words, there is a lack of development of a technical framework for detecting and appropriately responding to vehicle risks that support V2X and IVN. Currently, an intrusion detection system (IDS) mounted in a vehicle limitedly supports only lightweight algorithms due to a limitation of computing power of a vehicle system. Therefore, it is necessary to devise an intrusion response (or prevention) system for detecting an intrusion and suggesting a response, and to overcome the limitations of such computing power.

SUMMARY

Technical Problem

The present disclosure provides a method for detecting and preventing an attack on an Ethernet-based In-vehicle network (IVN) using software-defined networking (SDN) technology, and a system using the same.

Technical Solution

According to one aspect of the present disclosure, provided is an intrusion prevention system for an in-vehicle network (IVN). The intrusion prevention system comprises a software-defined networking (SDN)-enabled switch installed in the IVN of a vehicle and configured to control a flow of an incoming packet by referring to a flow entry from a flow table, and an SDN controller configured to communicate with the SDN-enabled switch, receive the flow table at a certain time interval T from the SDN-enabled switch to perform monitoring, and transmit a monitoring result to the SDN-enabled switch. The SDN controller is further configured to transmit the flow table to an intrusion detection system (IDS) so that the IDS performs intrusion detection, and receive, as the monitoring result, a result of performing intrusion detection from the IDS.

According to another aspect of the present disclosure, provided is a method for detecting and preventing a vehicle intrusion using a software-defined networking (SDN)-enabled switch installed in an in-vehicle network (IVN) of a vehicle and an SDN controller located remotely from the vehicle. The method comprises transmitting, by the SDN-enable switch, a flow table to the SDN controller at certain time interval T; receiving, by the SDN controller, the flow table and transmitting the received flow table to an intrusion detection system (IDS); and enabling, by the SDN controller, the IDS to perform intrusion detection based on all or some of fields of each flow entry included in the flow table, and receiving, by the SDN controller, a result of the intrusion detection from the IDS. The method further comprises transmitting, by the SDN controller, a packet-out message containing the result of the intrusion detection to the SDN-enabled switch; and updating, by the SDN-enabled switch, the flow table based on the packet-out message.

Advantageous Effects

An SDN switch of the present disclosure may simultaneously monitor and block traffic flowing into an IVN. That is, the SDN switch may selectively block traffic identified as an attack, while monitoring traffic flowing into a vehicle based on a flow table.

According to the present disclosure, since whether a packet flowing into a vehicle is an intrusion packet and which flow control action to execute are determined remotely, rather than in the IVN, an intrusion packet may be detected based on high-performance detection technology requiring high computing performance, for example, deep learning or artificial intelligence methodology, regardless of an internal environment of the vehicle, and an appropriate response command may be presented according to a detection result. In addition, an intrusion detection system outside the vehicle enables a change or updating of a detection algorithm or model in real time regardless of the vehicle environment.

Furthermore, according to the present disclosure, internal traffic occurring in a plurality of vehicles may be simultaneously and comprehensively monitored in one place. This enables more precise attack detection by gathering vague anomalies that are difficult to detect from a single vehicle and comparing the gathered anomalies with normal traffic of other vehicles.

The technology of the present disclosure may also be applied by adding an SDN device to a common switch provided in an existing Ethernet-based vehicle. Accordingly, the technology of the present disclosure may be applied, while minimizing a change in topology of the Ethernet-based IVN.

DESCRIPTION OF EXEMPLARY EMBODIMENTS

Figure 1:
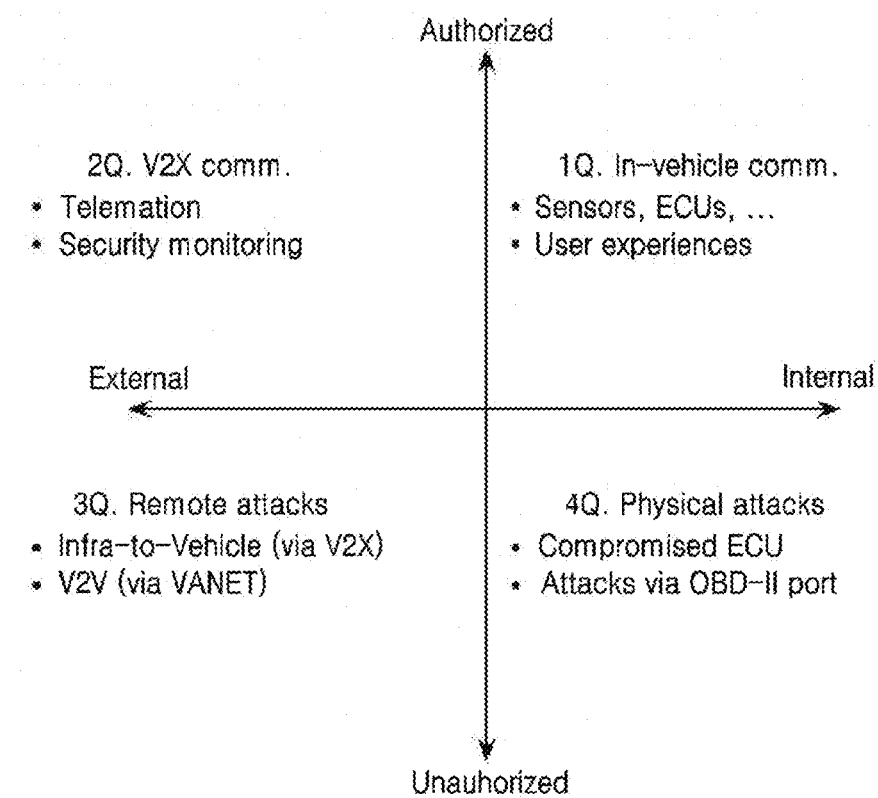
FIG. 1 is a diagram illustrating classification of types of security threats in vehicles.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The detailed description, which will be given below with reference to the accompanying drawings, is intended to explain exemplary embodiments of the present invention, rather than to show the only embodiments that can be implemented according to the present invention.

The present disclosure generally relates to an intrusion prevention method and an intrusion prevention system for detecting and responding to an attack on an Ethernet-based in-vehicle network (IVN) using a software-defined network (SDN) technology.

The SDN is a technology that separates a control part of network devices such as switches and routers from a data transmission part of the network devices and provides open interfaces for defining functions of the network devices enabling development of software that can set, control and manage various network paths and the flow of network traffic via the open interfaces.

Figure 2:
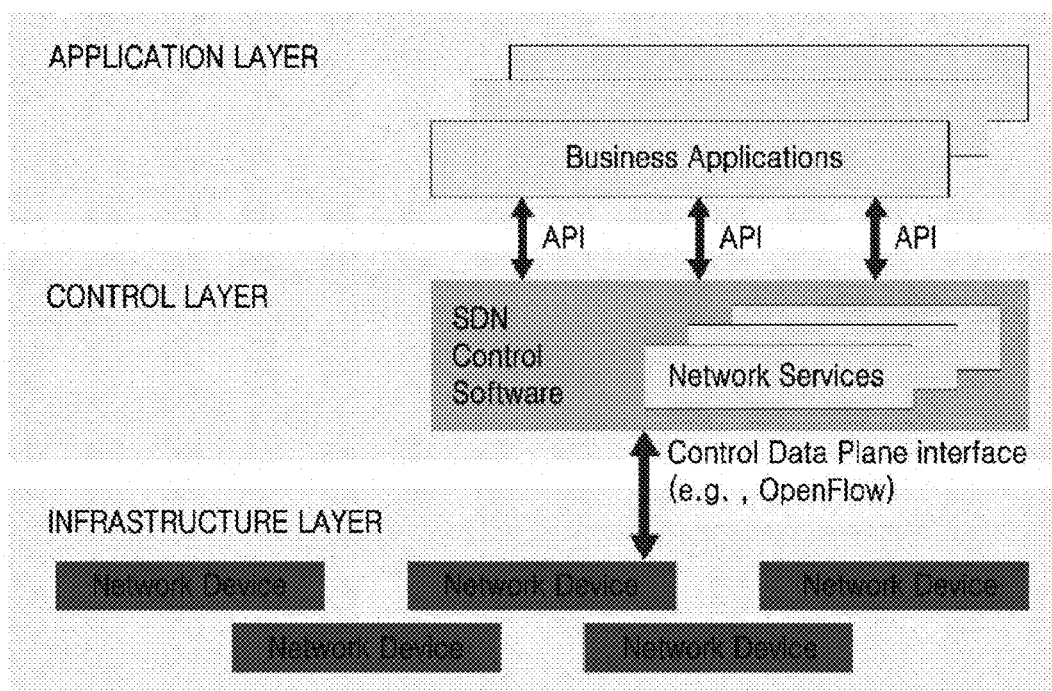
FIG. 2 is a conceptual diagram illustrating architecture of a typical Software-Defined Networking (SDN).

FIG. 2 is a conceptual diagram illustrating architecture of a typical SDN. The SDN architecture is defined as three layers including an application layer, a control layer, and an infrastructure layer. The application layer, control layer, and infrastructure layer are also called an application plane, a control plane, and an infrastructure plane (or a data plane), respectively. These layers communicate with each other through open interfaces. An open interface between the application layer and the control layer, which is referred to as a "northbound API", is an API enabling the development of applications with various functions and communication with other operating tools, and Restful APIs are generally used in the northbound API. An open interface between the control layer and the infrastructure layer, which is referred to as "southbound API", is an interface for forwarding control, information gathering, etc., and may include, for example, OpenFlow, OF-config, Netconf, etc.

Figure 3:
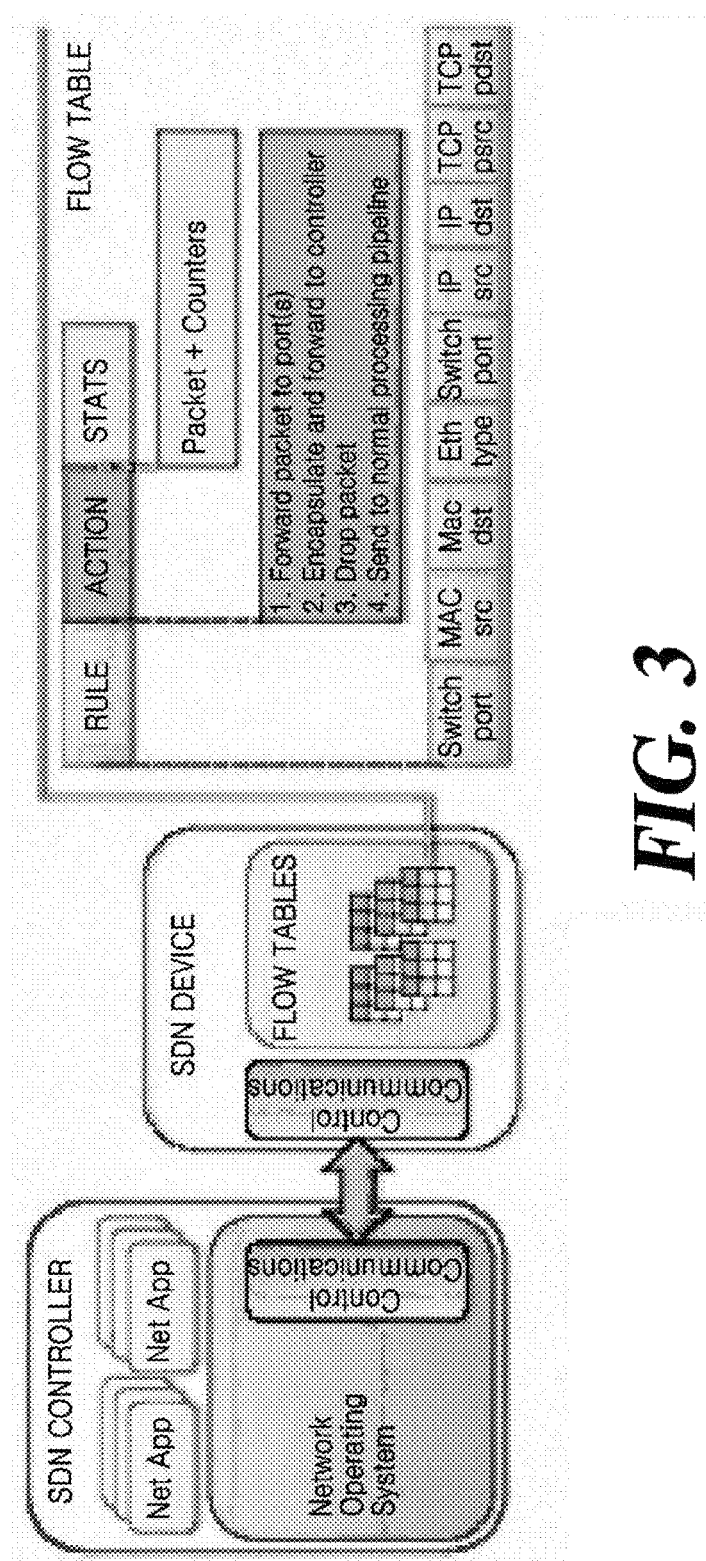
FIG. 3 illustrates an SDN controller and an SDN device constituting an SDN system and a configuration field of a flow entry configuring a flow table mounted in the SDN device.

FIG. 3 illustrates an SDN system including an SDN controller and an SDN device, and fields of a set of flow entries contained in a flow table mounted in the SDN device. The SDN controller, which is a logical entity, is disposed in the control plane of the SDN system, and the SDN device, which is a hardware device, is disposed in the data plane. The flow table mounted in the SDN device includes the following three main fields to process a packet received by the SDN device. The main fields include packet header information (Rule field) defining a flow, an ACTION field indicating how to process a packet, and an STATS field representing statistics for each flow. A controller may create flow tables in a switch using the southbound API, which includes a function to register a new flow or delete a flow.

Figure 4:
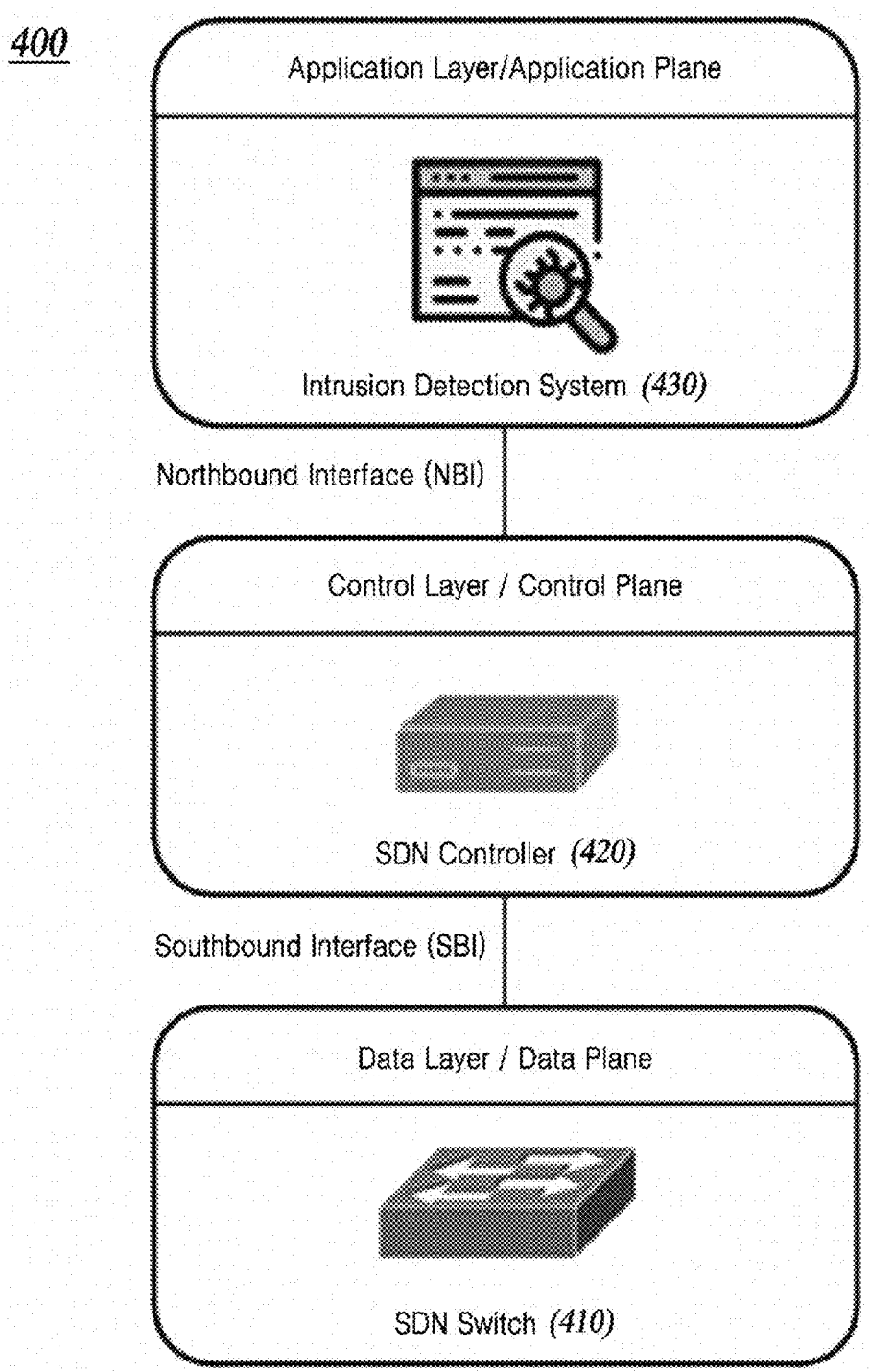
FIG. 4 is a conceptual diagram schematically illustrating a structure of an intrusion prevention system according to an embodiment of the present disclosure.

FIG. 4 is a conceptual diagram schematically illustrating a structure of an intrusion prevention system (IPS) according to an embodiment of the present disclosure.

As described above, the intrusion prevention system 400 of the present disclosure utilizes the SDN technology. Since an SDN is a virtualized architecture, it is not necessary to physically co-locate components thereof. According to the intrusion prevention system 400 of the present disclosure, an in-vehicle network (IVN) having an SDN-enabled switch (shortly, SDN switch) 410 is disposed on the data plane of the SDN system, an SDN controller 420 is disposed on the control plane of the SDN system, and an intrusion detection system (IDS) 430 is disposed on the application plane of the SDN system.

The intrusion prevention system 400 separates, from the IVN, a logical or physical entity which determines whether there is an intrusion by analyzing a state of a vehicle in which traffic occurs and statistics of the traffic and determines a response according to a determination result. An operating subject of the IDS 430 may be different from an operating subject of the SDN controller 420.

The SDN-enabled switch 410 provided in the IVN controls traffic occurring in the IVN or traffic flowing into the IVN based on the flow table. The SDN controller 420, which is located remotely from the vehicle and is connected to the vehicle through V2I communication, receives periodically the flow table at a certain time interval from the SDN-enabled switch 410, and receives, as a result of monitoring the received flow table, a result of performing intrusion detection from the IDS 430 to allow the SDN-enabled switch 410 to update the flow table.

Hereinafter, the functions and operations of the SDN-enabled switch 410, the SDN controller 420, and the IDS 430 in the proposed intrusion prevention system 400 are described in detail.

The SDN-enabled switch 410 is mounted in the vehicle and controls a flow of all traffic or packets (hereinafter, collectively referred to as "packets") flowing in IVN or V2X communication of the vehicle. The SDN-enabled switch 410 may be an SDN switch or a common switch combined with an SDN device to operate in an SDN environment, but is not limited thereto. For example, the SDN-enabled switch 410 according to the present embodiment may be any switch as long as the switch is able to control a flow of packets generated in an IVN of a vehicle or in V2X environment and communicate with the SDN controller 420 of the control plane.

The SDN-enabled switch 410 controls the packets flowing into the SDN-enabled switch 410 using the flow table. According to one aspect of this embodiment, the SDN-enabled switch 410 compares packet-related data such as port information with a rule field of each flow entry in the flow table, and then extracts or refers to a flow entry matched to a given packet. Such matching varies depending on a specification of the southbound API corresponding to a communication protocol between the SDN-enabled switch 410 and the SDN controller 420. For example, as shown in FIG. 4, the rule field of the flow entry may include a switch port, a MAC source (Mac src), an Ethernet type (Eth type), a VLAN ID, an IP source (IP src), etc. In this case, matching between packet data and a flow entry may be established when (1) all match, (2) match within a preset range, or (3) match more than a preset number with respect to the specification of the rule field. In this case, there may be a plurality of flow entries matched to the given packet.

When there is a flow entry matched to the incoming packet, the SDN-enabled switch 410 extracts the flow entry and executes a command of an action field of the flow entry. According to an aspect of the present embodiment, when there are a plurality of flow entries matched to the incoming packet, the SDN-enabled switch 410 may refer to a priority field included in each flow entry and may extract a flow entry having the highest priority among the plurality of flow entries.

Transmission of all packets flowing into the SDN-enabled switch 410 to the SDN controller 420 may cause privacy infringement and waste of resources. Therefore, according to an aspect of the present embodiment, a packet-in message containing the incoming packet may be transmitted to the SDN controller 420 when packet control cannot be performed using only the flow table such as a case in which there is no flow entry matched to the incoming packet and a case in which a validity period of the matched flow entry has already expired. The packet-in message may be generated in compliance with an interface employed by the SDN-enabled switch 410 and the SDN controller 420. The SDN controller 420 may transmit, to the SDN-enabled switch 410, a packet-out message which contains the packet included in the packet-in message and a forwarding action. The SDN-enabled switch 410 properly controls the introduced packet by updating the flow table based on the received packet-out message.

Alternatively, the SDN-enabled switch 410 may employ a data-driven detection method using the function of the SDN-enabled switch 410 that controls all packet data based on the flow table. In the data-driven detection method, the SDN-enabled switch 410 transmits the flow table to the SDN controller 420 at a certain time interval "T" or in response to a query received at a certain time interval "T" for requesting the flow table from the SDN controller 420 so that intrusion detection can be performed, and the SDN-enabled switch 410 receives a result of intrusion detection from the SDN controller 420 and update the flow table based on the result of intrusion detection. The packet control and the intrusion detection are performed separately in the data-driven detection method.

Here, the time interval "T" at which the SDN controller 420 receives the flow table may be set or reset based on all or some of an internal or external environment of the vehicle, a driving environment, the intrusion detection method employed by the IDS 430, and the result of performing intrusion detection. The setting or resetting of the time interval "T" may be determined by the SDN-enabled switch 410 based on the packet-out message received from the SDN controller 420, may be determined by the SDN controller 420 based on monitoring of the received packet-in message or the packet flow, or may be determined by the IDS 430.

The packet-out message may contain a result of intrusion detection. For example, when it is determined that there is an intrusion, the packet-out message may contain rules that can filter out intrusive packets or attacks, and corresponding response (e.g., a packet drop action, a packet drop and source blocking action, a packet drop and forward-to-controller action, reduction of time interval "T", etc.). The SDN-enabled switch 410 may respond to intrusion detection by adding a new flow entry to the flow table, updating the existing flow table, or changing time interval "T", based on the packet-out message. A subject that determines these rules and corresponding actions may be an external device (e.g., an IDS 430, etc.) that has received a request from the SDN controller 420 or the SDN controller 420 itself. The data-driven intrusion detection method is described below in detail with reference to FIGS. 9A and 9B.

The flow entry may further include a statistics field (STATS field of FIG. 4) as well as the rule field and action field described above. The statistics field is a field for storing statistical data collected or calculated for packets, and may include a counter field. The counter field records the number of times the rule field of the flow entry is matched to incoming packets, and the number of times may be cumulatively increased or be initialized with a preset period in some cases. The counter field may contain a match counter which is set to count the number of matches with the incoming packets within a predetermined reference value or may further contain a byte counter which is set to count the number of bytes per second of the matched packet.

The SDN-enabled switch 410 may update the flow table only when receiving a message from the SDN controller 420. The SDN-enabled switch 410 operates in a fail-safe mode when communication with the SDN controller 420 (e.g., communication based on the southbound API) is cut or until the connection to the SDN controller 420 resumes during cold boot (e.g., engine start). In the fail-safe mode, the SDN-enabled switch 410 may control the packet flow based on a flow table set as a default by a vehicle manufacturer. In this case, the SDN-enabled switch 410 operates as a common switch.

The SDN controller 420 receives a packet-in message or a flow table from the SDN-enabled switch 410. As described above, when the SDN controller 420 receives the packet-in message, the SDN controller 420 generates a packet-out message which contains the corresponding packet and the forwarding action and transmits the packet-out message to the SDN-enabled switch 410. When the SDN controller 420 receives the flow table, the SDN controller 420 transmits the flow table to the IDS 430. Then, the IDS 430 performs intrusion detection, and the SDN controller receives a result (e.g., an action) of performing intrusion detection. The SDN controller 420 transmits, to the SDN-enabled switch 410, a packet-out message which contains the result of performing intrusion detection.

The SDN controller 420 may be a dedicated controller for SDN or a general controller combined with an SDN device to operate in an SDN environment, but is not limited thereto. For example, the SDN controller 42 according to the present embodiment may include any controller as long as the controller is able to manage packets generated in the IVN or V2X environment and communicate with the SDN-enabled switch 410 or a vehicle equipped the SDN-enabled switch 410.

The SDN controller 420 may generate a new rule (e.g., change of time interval "T", setting of a rule field of a flow entry, etc.), that may filter out the corresponding intrusion, according to the result of performing intrusion detection received from the IDS 430, and include the new rule in the packet-out message. Such a new rule may be generated by receiving it from the IDS 430 or an external device.

According to another aspect of the present embodiment, the SDN controller 420 may perform management of a southbound API-based connection such as OpenFlow, flow table management, or packet statistics gathering with one or more SDN-enabled switches 410 mounted in one or more vehicles. The SDN controller 420 may also perform management of a northbound API-based connection, such as an ad-hoc API, RESTful API, or other programming interface, with one or more IDSs (such as 430 in FIG. 4).

The IDS 430 communicates with the SDN controller 420, receives a flow table from the SDN controller 420, performs intrusion detection, determines an action corresponding to a result of performing intrusion detection, and transmits the determined action to the SDN controller 420. For example, according to an aspect of the present embodiment, the IDS 430 monitors each field of each flow entry in the flow table, and when counter increment is abnormal or when an unauthorized source node sends a packet to a processor requiring authorization, the IDS 430 may determine the situation as an attack, specify a rule for filtering out the corresponding flow or may specify an action field of a specific flow entry as a packet drop command. According to another aspect of the present embodiment, the IDS 430 may determine a packet drop command and a forward-to-controller command as an action. This action causes the SDN-enabled switch 410 to drop the type of packet in the IVN and forward the type of packet to the SDN controller 420 so that the SDN controller 420 can monitor the type of packet. For such monitoring, the SDN controller 420 may receive flow statistics from another device or the SDN-enabled switch 410.

Hereinafter, exemplary topologies of a data plane, a control plane, and an application plane of the proposed intrusion prevention system are described with reference to FIGS. 5A, 5B, 6A, 6B, 7A, and 7B, respectively.

Figure 5A:
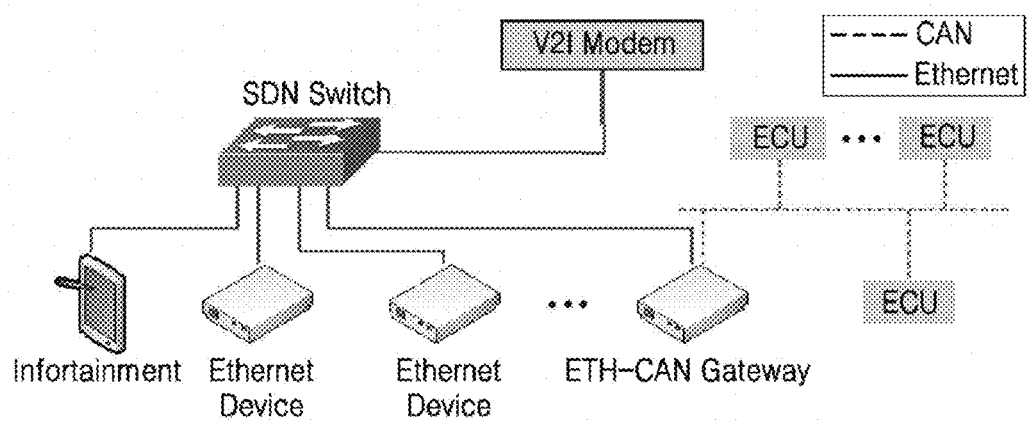
FIGS. 5A and 5B are diagrams illustrating an exemplary topology of an in-vehicle network (IVN) according to an embodiment of the present disclosure.
Figure 5B:
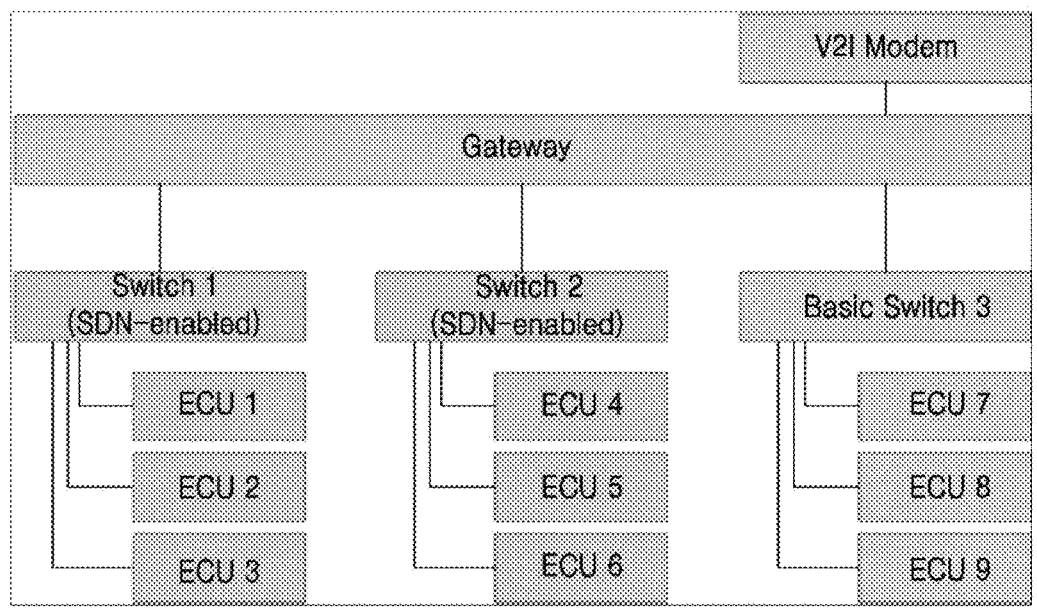

FIGS. 5A and 5B are diagrams illustrating an exemplary topology of an IVN according to an embodiment of the present disclosure.

FIG. 5A illustrates an exemplary topology of an IVN with a hybrid structure. The illustrated IVN includes various Ethernet devices, infotainment devices, one or more electronic control units (ECUs), and an Ethernet-based LAN including an SDN switch connected to these devices. Typically, high-speed data applications such as advanced driver-assistance system (ADAS) and multimedia may be connected to the SDN switch via an Ethernet-based LAN. The illustrated IVN includes a legacy CAN bus for some applications for which Ethernet is not suitable, such as power train systems that require message prioritization. The legacy CAN bus may be connected to the SDN-enabled switch via an ETH-CAN gateway supporting communication between Ethernet and the CAN bus. The SDN switch may communicate with other devices including the SDN controller 420 located remotely, servers, systems, etc. through a V2I communication modem.

FIG. 5B illustrates an exemplary topology of an Ethernet-based IVN. The illustrated IVN includes 3 switches (i.e., switch 1, switch 2, and basic switch 3) and nine ECUs. It should be noted that the number of switches or the number of ECU devices may vary depending on the method of configuring the topology. To ensure that all packets generated by the ECUs are passed through a switch to respective destination nodes, each ECU must be connected to the switch alone, and multiple ECUs do not occupy a single bus-line.

Switch 1 and switch 2 are SDN-enabled switches with an activated SDN function. The two switches are connected to the SDN controller through a wireless modem responsible for communication between the vehicle and an external infrastructure (i.e., V2I communication). When a connection with the SDN controller is established, switch 1 and switch 2 process packets of ECU 1 to ECU 6 based on actions received from the SDN controller, and cannot determine the action of each packet by themselves. However, when the connection with the SDN controller is cut off due to a failure of the wireless modem, switch 1 and switch 2 operate like basic switch 3, which will be described below. Accordingly, the vehicle based on the intrusion prevention system 400 according to the present embodiment may maintain a normal operation even in an emergency (e.g., fail-safe operation) and allow each function of the intrusion prevention system 400 to be selectively applied.

According to a command or action received from the SDN controller, switch 1 and switch 2 may block packets considered to be an attack, without forwarding the packets to other ECUs, and in addition, switch 1 or switch 2 may transmit it to the SDN controller for post-analysis. Determination of whether the packet corresponds to an intrusion by an attacker is performed by an external intrusion detection system.

Basic switch 3 is not an SDN-enabled switch according to the present embodiment, but a conventional switch that performs MAC address learning and that has been adopted to an existing vehicle. When basic switch 3 knows a destination of a packet sent by ECU 7 to ECU 9, basic switch 3 forwards the packet to a specific port, and when basic switch 3 does not know the destination, basic switch 3 broadcasts the packet to all ports. Basic switch 3 does not support packet information gathering function for intrusion detection/response and does not receive an action designated to control a packet flow from an external device such as the SDN controller.

Figure 6A:
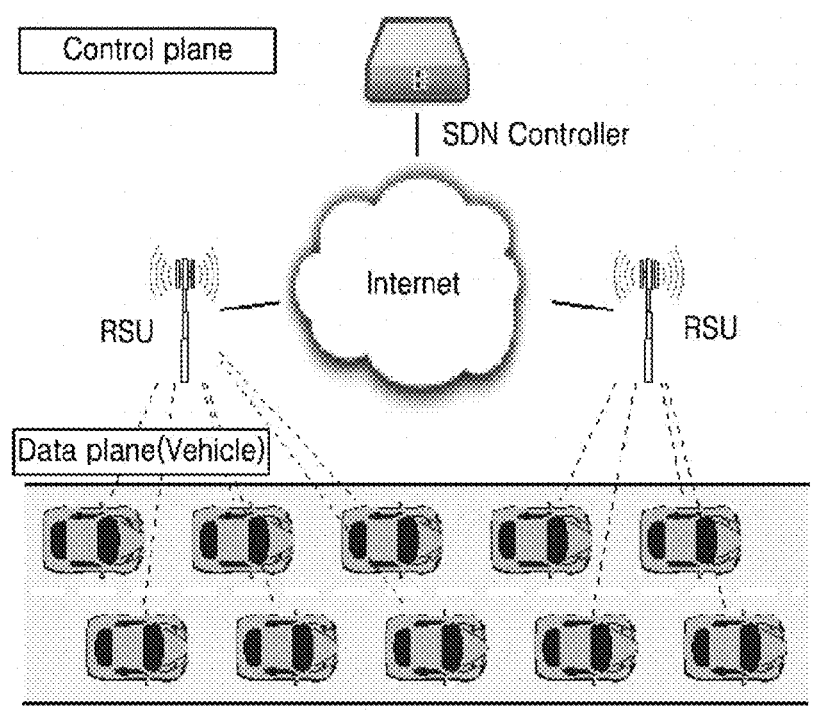
FIGS. 6A and 6B are diagrams illustrating a control plane topology of a centralized and distributed structure of an intrusion prevention system according to an embodiment of the present disclosure.
Figure 6B:
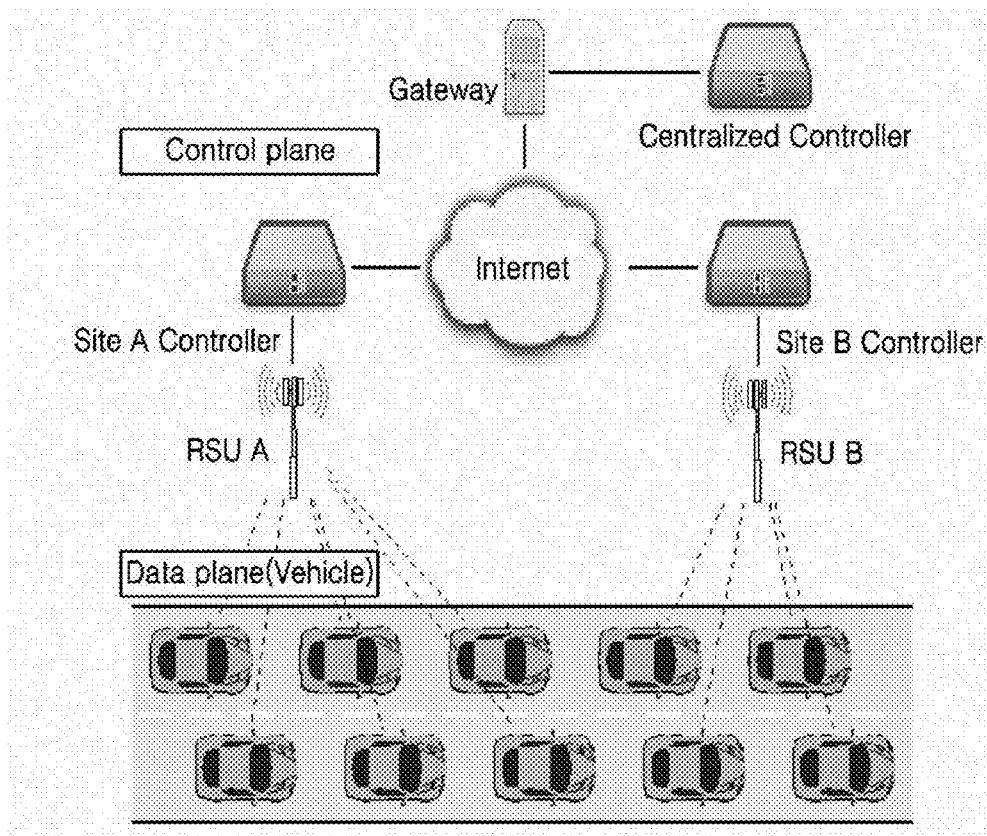

FIGS. 6A and 6B are diagrams illustrating a control plane topology of a centralized structure and a distributed structure of an intrusion prevention system according to an embodiment of the present disclosure.

Typically, the SDN controller disposed in the control plane may transmit and receive data to and from SDN switches within a plurality of vehicles. FIG. 6A illustrates a centralized structure in which a single SDN controller manages all packets of vehicles. The IDS of the present disclosure may achieve the intended purpose may with only one SDN controller, but multiple SDN controllers may also be introduced and operated in consideration of latency and load balancing. FIG. 6B illustrates a distributed structure in which each of several base SDN controllers manage one or more vehicles that are physically or logically close thereto. For example, the SDN controllers may be implemented in an edge cloud server or a fog server for each base. The SDN controllers for each base may perform primary communication with a vehicle that is physically or logically close thereto and deliver a corresponding result to a centralized SDN controller. In the centralized architecture, the single SDN controller performs communication with the IDS 430 using the northbound API, and in the distributed architecture, the central SDN controller performs communication with the IDS 430 using the northbound API.

Figure 7A:
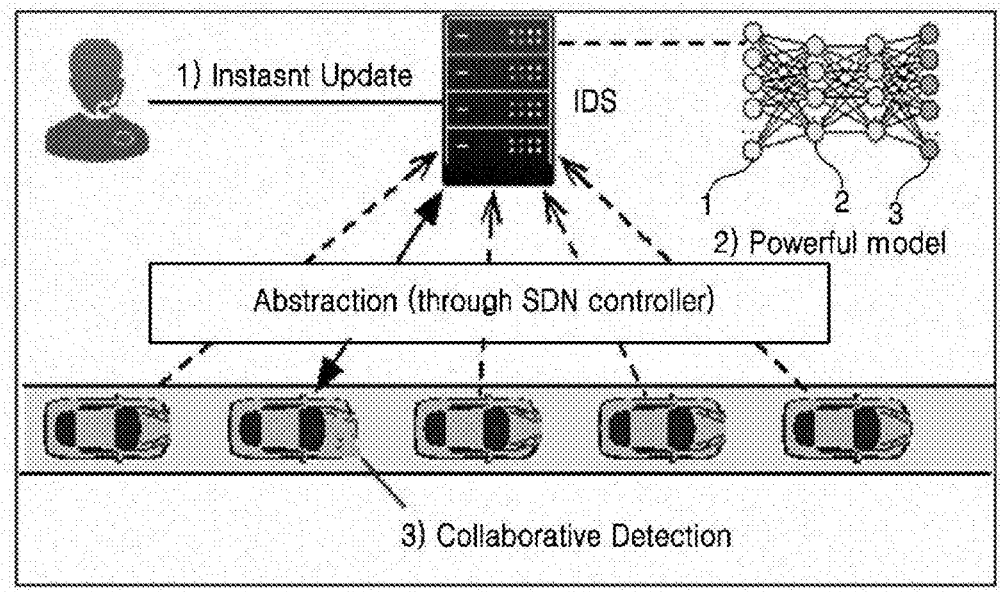
FIGS. 7A and 7B are diagrams illustrating a topology of an intrusion detection system (IDS) applicable to an intrusion prevention system according to an embodiment of the present disclosure.
Figure 7B:
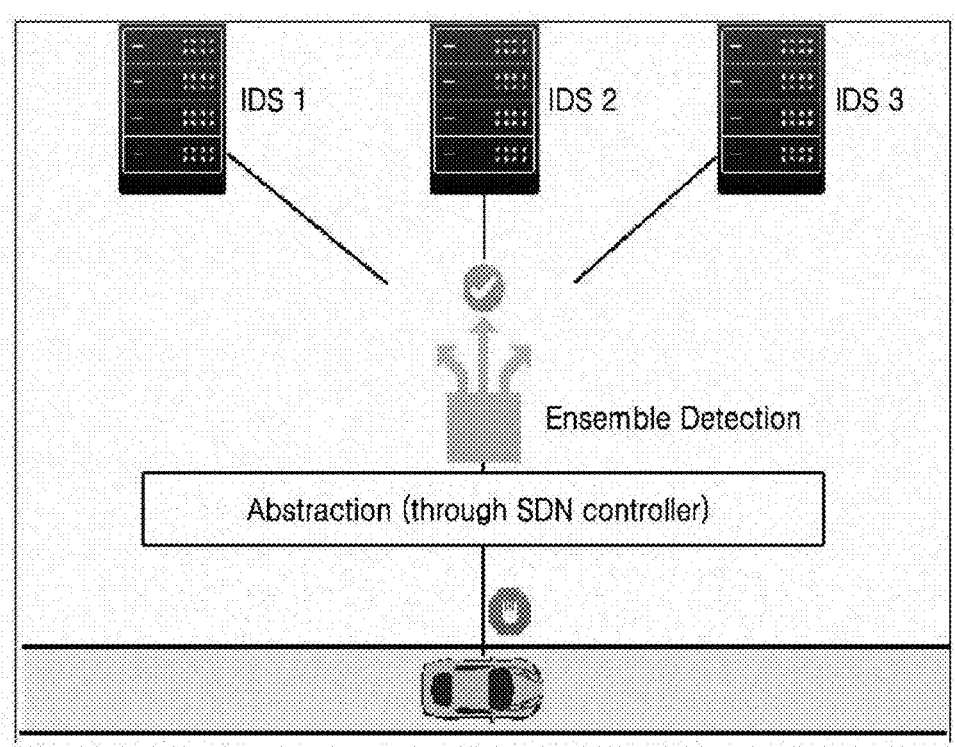

FIGS. 7A and 7B are diagrams illustrating topology of an IDS applicable to an intrusion prevention system according to an embodiment of the present disclosure.

The recently proposed Deep Learning-based IDS requires more resources such as GPU to obtain precise detection results. A computing system mounted in a vehicle has minimum performance required for driving, and thus, the computing system is inappropriate for operating the Deep Learning-based IDS. An IDS disposed outside the vehicle no longer have to consider in-vehicle performance issues for computing intrusion detection algorithms. Therefore, the proposed intrusion prevention system may employ an IDS that operates a precise intrusion detection algorithm requiring high computing power, such as a deep learning algorithm illustrated in FIG. 7A.

In the proposed intrusion prevention system, several IDSs may be operated concurrently. Each IDS is responsible for intrusion detection for a specific protocol (e.g., IDS 1 for SSH, IDS 2 for AVTP, IDS 3 for UDP), alternatively, as illustrated in FIG. 7B, an ensemble technique using detection results of several IDSs operating different detection algorithms may be used.

Disposing the IDS outside the vehicle rather than within the IVN provides a lot of flexibility in the operation of the intrusion prevention system. The IDS may be updated in real time regardless of a location or status of the vehicle being analyzed. For example, the IDS may dynamically add, reconfigure, or remove an intrusion detection model or algorithm even when the vehicle to be analyzed is driving. In addition, if a new function is introduced in an individual vehicle or a new attack pattern against an individual vehicle is discovered, an operator (or a service provider) can update the detection model using related data.

Figure 8:
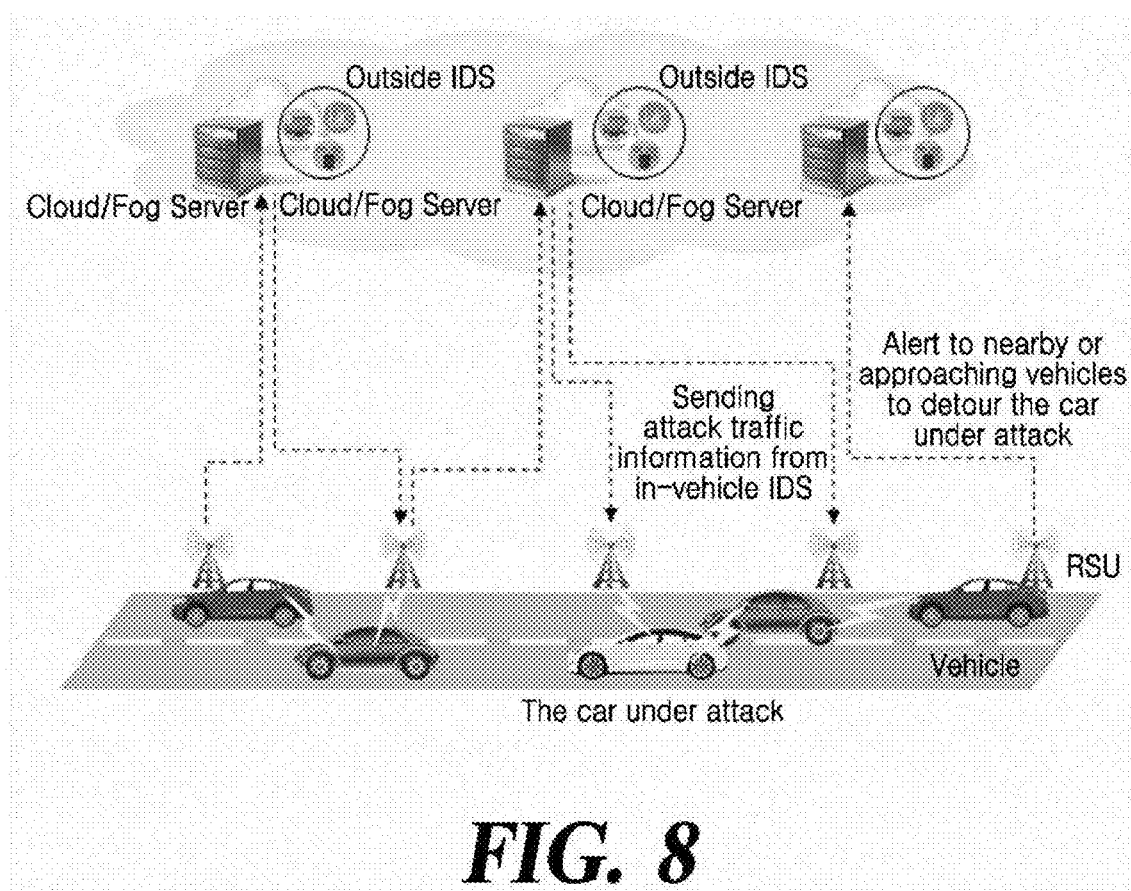
FIG. 8 is a diagram illustrating a use case scenario supporting usefulness of an intrusion prevention system according to the present disclosure.

FIG. 8 is a diagram illustrating a use case scenario supporting usefulness of an intrusion prevention system according to the present disclosure.

(1) Whenever an attack is detected, all vehicles transmit the detected attack information to the IDS through the SDN controller on a cloud server or fog server. In this case, a road-side unit (RSU) may relay communication between an adjacent vehicle and each server. A communication method of the RSU may be based on a near field communication (NFC), Bluetooth low energy (BLE), wireless LAN (WIFI), ultra wideband (UWB), radio frequency, infrared data association (IrDA), Zigbee, LTE, or 5G.

(2) When a certain vehicle, which is one of vehicles to which the intrusion prevention system or method of the present disclosure is applied, is being attacked, the IDS mounted in the certain vehicle transmits attack traffic information or packets suspected of being an attack to the cloud server or fog server.

(3) The SDN controller on the cloud server or fog server sends the attack traffic information or the packets to the IDS, and the IDS analyzes the data. If it is determined that there is an attack, the IDS transmits a warning command to the certain vehicle to take a detour, to each nearby vehicle through the SDN controller.

(4) When vehicle-to-vehicle (V2V) communication is activated, the certain vehicle may share its state with adjacent vehicles.

(5) When remote control by an external device is permitted, the external device may control the certain vehicle to decelerate and pull-drive at the request of the cloud server or the fog server.

Figure 9A:
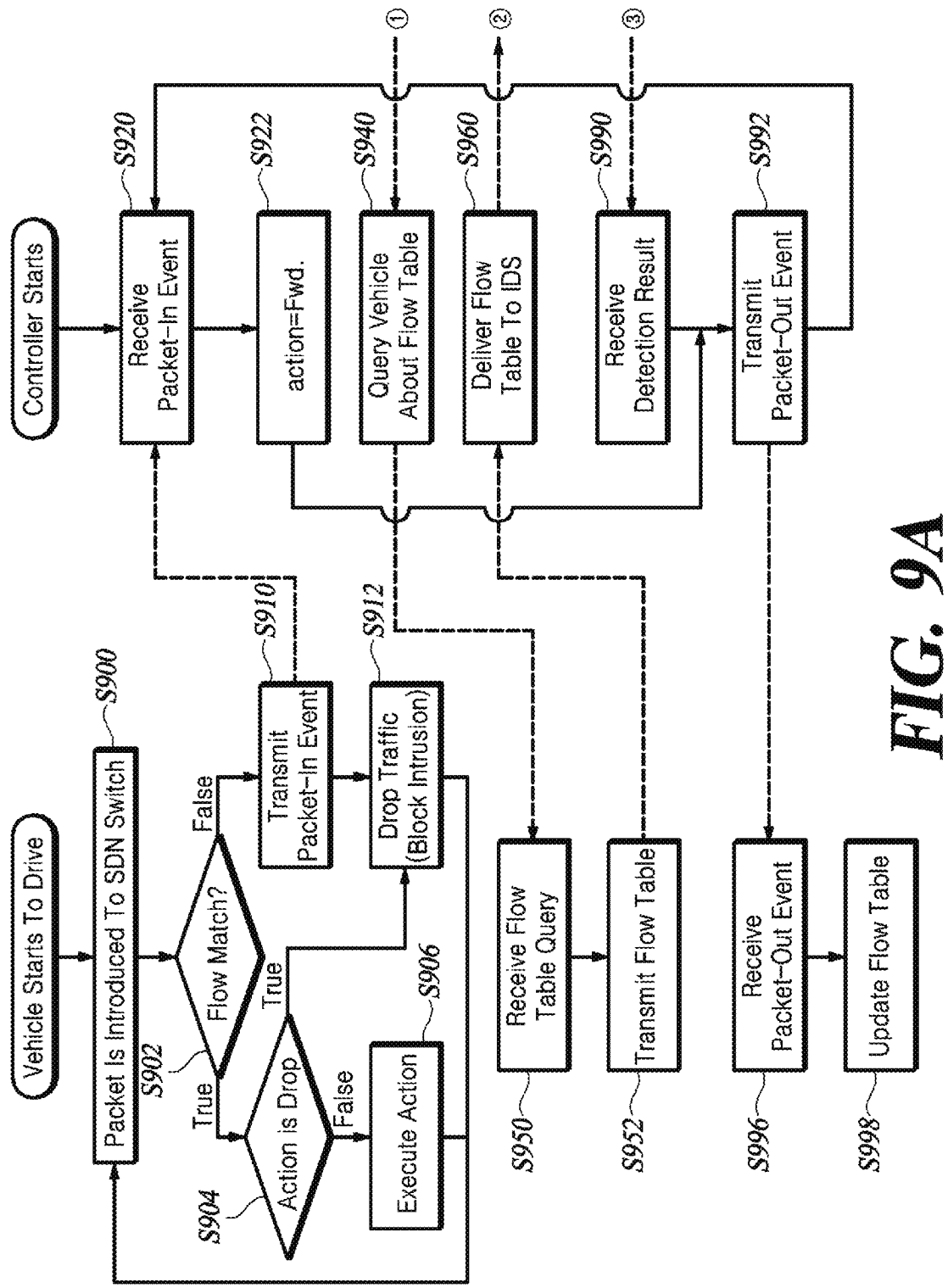
FIGS. 9A and 9B are flowcharts illustrating a data-driven intrusion detection and prevention method according to the present embodiment.
Figure 9B:
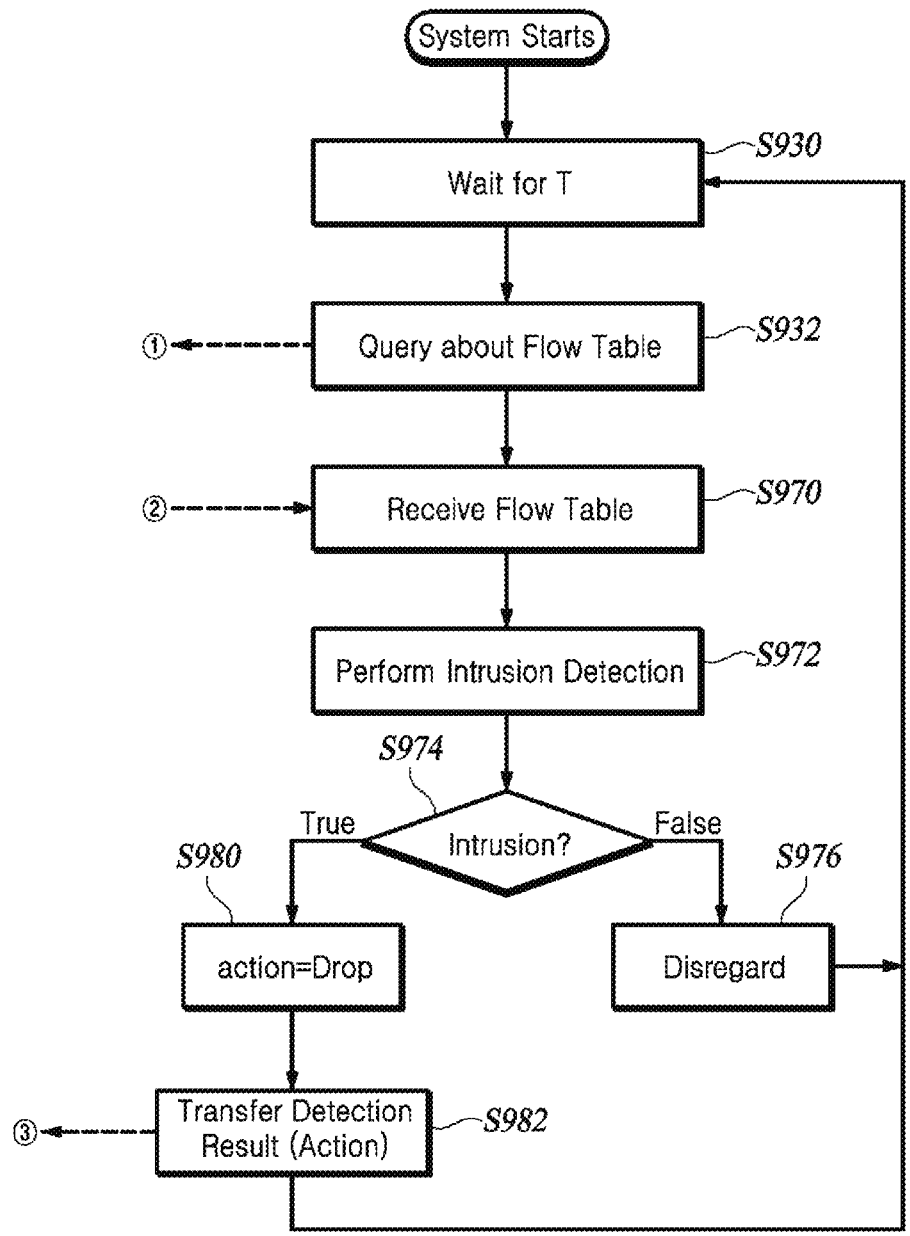

FIGS. 9A and 9B are flowcharts illustrating a data-driven intrusion detection and prevention method according to the present embodiment.

FIG. 9A shows a process in which the SDN-enabled switch 410 and the SDN controller 420 perform data-driven intrusion detection.

When a vehicle (e.g., CAV) to which an intrusion prevention system 400 according to the present embodiment is applied starts driving, a packet is flowed from an IVN or V2X environment to the SDN-enabled switch 410 (S900).

The SDN-enabled switch 410 determines whether there is a flow entry having a rule field matched to the packet in a loaded flow table (S902).

If there is a matched flow entry, the SDN-enabled switch 410 determines whether a packet drop command is included in an action field of the matched flow entry (S904), and if there is no packet drop command, the SDN-enabled switch 410 performs a command of the action field without the packet drop (S906).

If there is a packet drop command, the SDN-enabled switch 410 drops the corresponding packet and blocks traffic from a corresponding source (S912).

When there is no flow entry matched to the incoming packet or when the matched flow entry expires so there is no matched flow entry resultantly, the SDN-enabled switch 410 transmits a packet-in message, which contains the incoming packet and event information such as a port number, to the SDN controller 420 outside of the vehicle (S910), drops the incoming packet, and blocks the corresponding traffic (S912).

The SDN controller 420 receives the packet-in message (S920), designates a forwarding action (S922), generates a packet-out message containing the forwarding action, and transmits the packet-out message to the SDN-enabled switch 410 (S992).

The SDN controller 420 receives a query requesting a flow table from the IDS 430 (S940) and delivers the query to the SDN-enabled switch 410.

The SDN-enabled switch 410 receives the query requesting a flow table from the SDN controller 420 and transmits a flow table to the SDN controller 420 (S950 and S952).

Upon receiving the flow table from the SDN-enabled switch 410, the SDN controller 420 delivers the flow table to the IDS 430 (S960).

The SDN controller 420 receives a result of performing intrusion detection based on the flow table from the IDS 430 (S990), generates a packet-output message which contains the result of performing intrusion detection, and transmits the packet-out message to the SDN-enabled switch 410 (S992).

The SDN-enabled switch 410 receives the packet-out message from the SDN controller 420 (S996) and updates the flow table (S998). Such updating may include adding a new flow entry, updating expiration information of an expired flow entry or each field of a flow entry, or leaving the flow table as it is if there are no new contents to be updated.

FIG. 9B shows a process in which the IDS 430 performs data-driven intrusion detection.

The IDS 430 waits for a time interval (for "T" in S930) for requesting the flow table (S930) and queries the SDN controller 420 (S932).

When the flow table is received from the SDN controller 420 (S970), the IDS 430 performs intrusion detection based on each field of each flow entry in the flow table and flow statistics (S972).

When the IDS 430 determines that there is an intrusion (S974), the IDS 430 determines to drop the packet associated with the intrusion (S980). This determination may also be performed by including a drop command in an action field of the flow entry matched to the packet associated with the intrusion. The IDS 430 transmits a detection result including the drop action to the SDN controller 420 (S982).

However, if it is determined that there is no intrusion, the IDS 430 does not transmit the detection result (S976).

Although it is described that each process is sequentially executed in FIGS. 9A and 9B, this is merely illustrative of the technical idea of an embodiment of the present disclosure. In other words, those skilled in the art to which an embodiment of the present disclosure pertains may make various modifications and variations to be applied such as executing the process by changing the order described in FIGS. 9A, and 9B or executing one or more processes of each process in parallel, without departing from the essential characteristics of an embodiment of the present disclosure, and thus, the present disclosure is not limited to the time-series sequence of FIGS. 9A, and 9B.

Various implementations of the systems and techniques described herein may be realized by digital electronic circuitry, integrated circuits, field programmable gate arrays (FPGAs), application specific integrated circuits (ASICs), computer hardware, firmware, software, and/or combinations thereof. These various implementations may include implementation as one or more computer programs executable on a programmable system. The programmable system includes at least one programmable processor (which may be a special-purpose processor or a general-purpose processor) coupled to receive data and instructions from a storage system, at least one input device, and at least one output device and transmit data and instructions thereto. Computer programs (also known as programs, software, software applications, or code) include instructions for a programmable processor and are stored in a "computer-readable medium".

The computer-readable recording medium includes all types of recording devices in which data readable by a computer system is stored. The computer-readable recording medium may be non-volatile or non-transitory mediums, such as ROM, CD-ROM, magnetic tape, floppy disk, memory card, hard disk, magneto-optical disk, and storage device and may further include a transitory medium such as a data transmission medium. In addition, the computer-readable recording medium may be distributed in a network-connected computer system, and a computer-readable code may be stored and executed in a distributed manner.

Various implementations of the systems and techniques described herein may be implemented by a programmable computer. Here, the computer includes a programmable processor, a data storage system (including volatile memory, non-volatile memory, or other types of storage systems, or combinations thereof), and at least one communication interface. For example, the programmable computer may be one of a server, a network appliance, a set-top box, an embedded device, a computer expansion module, a personal computer, a laptop, a personal data assistant (PDA), a cloud computing system, or a mobile device.

DESCRIPTION OF REFERENCE NUMERALS

400: Intrusion Prevention System
410: SDN-enabled switch
420: SDN controller
430: Intrusion Detection System (IDS)

CROSS-REFERENCE TO RELATED APPLICATION

This application claims priority to Korean Patent Application No. 10-2019-0093503, filed on Jul. 31, 2019, and Korean Patent Application No. 10-2020-0095519, filed on Jul. 30, 2020, the entire contents of which are incorporated herein by reference.

What is claimed is:

1. An intrusion prevention system for an in-vehicle network (IVN) of a vehicle, the intrusion prevention system comprising:
a software-defined networking (SDN)-enabled switch, installed in the IVN, configured to control a flow of an incoming packet by referring to a flow entry from a flow table; and
an SDN controller, located remotely from the vehicle, configured to communicate with the SDN-enabled switch,
wherein the SDN controller is configured to,
receive flow statistics from the SDN-enabled switch,
transmit the flow statistics to an intrusion detection system (IDS) so that the IDS performs intrusion detection, and
receive a monitoring result of intrusion detection from the IDS when an intrusion is detected, and
transmit the monitoring result to the SDN-enabled switch,
wherein the flow entry includes a rule field, an action field, and a statics field including a match counter field and a byte counter field, and
wherein the SDN-enabled switch is further configured to compare the incoming packet with the rule field of each flow entry of the flow table, update the match counter field when the incoming packet matches the rule filed of a flow entry of the flow table, and update the byte counter field by calculating the number of bytes per second of the matched packet.

2. The intrusion prevention system of claim 1, wherein a time interval T at which the SDN controller receives the flow statistics from the SDN-enabled switch is set or reset based on all or part of an internal or external environment of the vehicle, a driving environment of the vehicle, an intrusion detection method employed by the IDS and the result of performing intrusion detection.

3. The intrusion prevention system of claim 1, wherein the SDN controller is further configured to communicate with respective interfaces with a plurality of SDN-enabled switches and receive respective flow statistics from the plurality of SDN-enabled switches, and a time interval T at which the SDN controller receives the flow statistics is individually set for each of the plurality of SDN-enabled switches.

4. The intrusion prevention system of claim 3, wherein the flow entry includes one or more fields, and the one or more fields are determined according to an interface employed by each of the plurality of SDN-enabled switches.

5. The intrusion prevention system of claim 1, wherein the SDN-enabled switch updates the flow table upon receiving the monitoring result.

6. A method for detecting and preventing a vehicle intrusion using a software-defined networking (SDN)-enabled switch installed in an in-vehicle network (IVN) of a vehicle and an SDN controller located remotely from the vehicle, the SDN-enabled switch configured to control a packet flow of an incoming packet by referring to a flow entry from a flow table, the method comprising:

transmitting, by the SDN-enable switch flow statistics to the SDN controller;

receiving, by the SDN controller, the flow statistics and transmitting the flow statistics to an intrusion detection system (IDS);

receiving, by the SDN controller, a monitoring result of the intrusion detection from the IDS when an intrusion is detected;

transmitting, by the SDN controller, the monitoring result to the SDN-enabled switch; and updating, by the SDN-enabled switch, the flow table based on the monitoring result, wherein the flow entry includes a rule field, an action field, and a statics field including a match counter field and a byte counter field, and comparing, by the SDN-enabled switch, the incoming packet with the rule field of each flow entry of the flow table, updating the match counter field when the incoming packet matches the rule filed of a flow entry of the flow table, and updating the byte counter field by calculating the number of bytes per second of the matched packet.

7. The method of claim 6, wherein a time interval T at which the SDN controller receives the flow statistics from the SDN-enabled switch is set or reset based on all or part of an internal or external environment of the vehicle, a driving environment of the vehicle, an intrusion detection method employed by the IDS, and the result of performing intrusion detection.

8. The method of claim 6, further comprising:

transmitting, by the SDN-enabled switch, to the SDN controller a packet-in message which contains the incoming packet introduced from the IVN; and transmitting, by the SDN controller, to the SDN-enabled switch, a packet-out message which contains the incoming packet and a forwarding action.

9. The method of claim 8, wherein the transmitting of the packet-in message to the SDN controller is performed when there is no flow entry matched to the incoming packet in the flow table or when a matched flow table has expired.

10. The method of claim 6, wherein the SDN controller is further configured to communicate with respective interfaces with a plurality of SDN-enabled switches and receive respective flow statistics from the plurality of SDN-enabled switches, and a time interval T at which the SDN controller receives the flow statistics is individually set for the plurality of SDN-enabled switches.

11. The method of claim 10, wherein the flow entry includes one or more fields, and the one or more fields are determined according to an interface employed by each of the plurality of SDN-enabled switches.

* * * * *